United States Patent
Hardin (10) Patent No.: US 10,955,843 B1
(45) Date of Patent: *Mar. 23, 2021

(54) VERIFIED INFERENCE ENGINE FOR AUTONOMY

(71) Applicant: Rockwell Collins, Inc., Cedar Rapids, IA (US)

(72) Inventor: David S. Hardin, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 65 days.

This patent is subject to a terminal disclaimer.

(21) Appl. No.: 16/049,311

(22) Filed: Jul. 30, 2018

Related U.S. Application Data (63) Continuation of application No. 15/264,587, filed on Sep. 13, 2016, now Pat. No. 10,095,230.

(51) Int. Cl.
  *G05D 1/00* (2006.01)
  *G06N 5/04* (2006.01)

(52) U.S. Cl.
  CPC .......... *G05D 1/0088* (2013.01); *G06N 5/046* (2013.01)

(58) Field of Classification Search
  CPC ............................. G05D 1/0088; G06N 5/046
  See application file for complete search history.

(56) References Cited

U.S. PATENT DOCUMENTS

| | | | |
|---|---|---|---|
| 5,701,400 A | 12/1997 | Amado | |
| 6,269,763 B1 | 8/2001 | Woodland | |
| 7,864,096 B2 | 1/2011 | Stayton et al. | |
| 8,078,338 B2 | 12/2011 | Pack et al. | |
| 8,612,085 B2 | 12/2013 | Flohr et al. | |
| 8,935,664 B2 | 1/2015 | Allam et al. | |
| 9,081,382 B2 | 7/2015 | Doyle et al. | |
| 9,090,319 B2 | 7/2015 | Brizard et al. | |
| 9,645,576 B2 | 5/2017 | Frangou | |
| 2005/0197994 A1* | 9/2005 | Fujii | B62K 21/00 706/59 |
| 2005/0288819 A1 | 12/2005 | De Guzman | |

(Continued)

OTHER PUBLICATIONS

Dataversity, "forward vs backward chaining—Answers", Enterprise Data World, San Diego, CA, Apr. 17-22, 2016, downloaded from https://web.archive.org/web/20160511082233/http:/answers.semanticweb.com:80/questions/3304/forward-vs-backward-chaining, May 1, 2017, 3 pages.

(Continued)

*Primary Examiner* — Calvin Cheung
(74) *Attorney, Agent, or Firm* — Suiter Swantz pc llo (57) ABSTRACT

An autonomous vehicle system includes one or more output devices, one or more input sources, and a controller. In some embodiments, a verified inference engine is used by the controller to generate outputs for the output devices from inputs received from the input sources. The inference engine may be verified to be mathematically correct with an automated theorem proving tool. The automated theorem proving tool may verify that the inference engine meets the design requirements of standards such as DO-178C Level A and/or EAL-7. The controller is configured to validate the inputs received from the input sources, store the validated inputs in a fact base, generate outputs from the validated inputs, validate the one or more outputs, and provide the one or more validated outputs to the output devices.

20 Claims, 7 Drawing Sheets

(56) References Cited

U.S. PATENT DOCUMENTS

| | | | |
|---|---|---|---|
| 2007/0112853 A1 | 5/2007 | Dettinger et al. | |
| 2007/0125289 A1 | 6/2007 | Asfar et al. | |
| 2007/0239314 A1* | 10/2007 | Kuvich | G06N 3/008 700/245 |
| 2009/0132456 A1 | 5/2009 | Dettinger et al. | |
| 2009/0228445 A1 | 9/2009 | Gangal | |
| 2009/0326735 A1 | 12/2009 | Wood et al. | |
| 2010/0100510 A1* | 4/2010 | Balaban | G06N 7/08 706/12 |
| 2012/0203419 A1* | 8/2012 | Tucker | G05D 1/0055 701/23 |
| 2013/0080360 A1* | 3/2013 | Sterritt | G06N 3/004 706/14 |
| 2013/0103630 A1* | 4/2013 | Yao | G06N 7/023 706/47 |
| 2013/0282210 A1* | 10/2013 | Kolar | B63H 25/04 701/21 |
| 2014/0249927 A1* | 9/2014 | De Angelo | G06Q 30/0269 705/14.64 |
| 2015/0253775 A1 | 9/2015 | Jacobus et al. | |
| 2016/0248847 A1 | 8/2016 | Saxena et al. | |
| 2017/0016740 A1 | 1/2017 | Cui et al. | |
| 2017/0102700 A1 | 4/2017 | Kozak | |
| 2017/0110022 A1 | 4/2017 | Gulash | |
| 2017/0123429 A1* | 5/2017 | Levinson | G05D 1/0214 |
| 2017/0248953 A1* | 8/2017 | Kelley | B60W 50/08 |
| 2017/0352041 A1 | 12/2017 | Ramamurthy et al. | |
| 2017/0374190 A1 | 12/2017 | Dowlatkhah et al. | |
| 2018/0082189 A1* | 3/2018 | Cormier | G06F 21/6218 |

OTHER PUBLICATIONS

Davis, Jared et al., "Milawa", downloaded from http://www.cs.utexas.edu/users/jared/milawa/Web/, May 1, 2017, 3 pages.

Machin, Mathilde et al. "Specifying Safety Monitors for Autonomous Systems Using Model-Checking", Association for Computing Machinery, 2017, downloaded from http://dl.acm.org/citation.cfm?id=2723325, May 1, 2017, 2 pages.

Machin, Mathilde, et al., "Specifying Safety Monitors for Autonomous Systems using Model-checking", International Conference on Computer Safety, Reliability, and Security, SAFECOMP 2014: Computer Safety, Reliability, and Security, 16 pages.

Notice of Allowance for U.S. Appl. No. 15/264,587 dated Jul. 5, 2018. 8 pages.

Pike, Lee et al., "Copilot: Monitoring Embedded Systems", NASA and Langley Research Center, NASA/CR-2012-217329, Jan. 1, 2012, downloaded from https://www.cs.indiana.edu/~lepike/pubs/copilot-cr.pdf, 36 pages.

Rushby, John, "Runtime Certification", Computer Science, Budapest, Hungary, Apr. 2008, pp. 6-9.

Singh, Swapna et al., "A Comparative Study of Inference Engines", 2010 Seventh International Conference on Information Technology, 5 pages.

Non-Final Office Action for U.S. Appl. No. 15/264,587 dated Feb. 13, 2018. 12 pages.

Zhang, Y. et al., "Applied Sensor Fault Detection and Validation using Transposed Input Data PCA and ANNs", 2012 IEEE International Conference on Multisensor Fusion and Integration for Intelligent Systems, Hamburg, Germany, Sep. 13-15, 2012, 6 pages.

* cited by examiner

VERIFIED INFERENCE ENGINE FOR AUTONOMY

CROSS REFERENCE TO RELATED PATENT APPLICATION

This application is a continuation of U.S. patent application Ser. No. 15/264,587 filed Sep. 13, 2016, now U.S. Pat. No. 10,095,230, the entirety of which is incorporated by reference herein.

BACKGROUND

The present disclosure relates generally to a verified inference engine for autonomous control of a system.

An inference engine is an artificial intelligence program that reasons about a set of rules in a rule base and fires rules based on information stored in a fact base. The fact base is a list of known facts that the inference engine stores. The inference engine can perform this reasoning with a forward-chaining or backward-chaining approach. The inference engine can fire the rules that it reasons about to create outputs for the inference engine as well as new information to be stored in the fact base.

One use of an inference engine is in an autonomous vehicle. Autonomous vehicles include a plurality of vehicle types. Autonomous vehicles include but are not limited to autonomous commercial aircraft, autonomous military aircraft, self-driving cars, autonomous surface ships, autonomous underwater vehicles (AUVs) and spacecraft. For many of these vehicles, high assurance of the inference engine design and operation is needed to verify that the autonomous control of the vehicle exhibits a high degree of reliability.

When an inference engine is used in an autonomous vehicle, a fact base may include information regarding the surroundings of the vehicle such as terrain, weather conditions, other vehicles, the physical surroundings of the autonomous vehicle, vehicle latitude/longitude, altitude/depth, speed, acceleration, pitch, roll, and yaw. The rule base applies a set of rules to the fact base and creates system outputs as well new facts for the fact base. The inference engine learns new facts and stores them in the fact base for future use in determining control outputs for the autonomous vehicle.

When an inference engine is used in an autonomous vehicle, it must meet a high degree of assurance. In aviation, the highest level of design assurance prevents failures which may cause the autonomous vehicle to suffer a catastrophic failure. A system in which a failure can be catastrophic needs to meet the highest level of design assurance. Details regarding the assurance levels necessary to control a vehicle with an inference engine can be found in development standards such as RTCA DO-178C, Software Considerations in Airborne Systems and Equipment Certification, Level A (for safe operation); and Evaluation Assurance Level 7 (EAL-7) of the Common Criteria (for secure operation). A Level A failure condition in the DO-178C standard is labeled catastrophic. To verify that software meets the DO-178C Level A standard, the software is tested with the modified condition/decision coverage (MC/DC) criterion. MC/DC coverage states four criteria for software. One criterion is that each entry and exit point is invoked. A second criterion is that each decision takes every possible outcome. A third criterion is that each condition in a decision takes every possible outcome. A fourth criterion is that each condition in a decision is shown to independently affect the outcome of the decision.

Inference engines used in autonomous vehicles must meet reliability standards such as the DO-178C Level A standard, or EAL-7 of the Common Criteria. To implement high assurance in an inference engine, a rule validator can be used to assure that the rules designed for the rule base are valid and consistent. Consistency in the rules stored in the rule validator leads to an inference engine that does not execute contradictory commands.

Further, high assurance can be achieved by validation of inputs and outputs of the inference engine. Validating all inputs from input sources provides the inference engine with reliable input data and stops the inference engine from making decisions based on flawed or unreliable data and verifies that the inference engine makes decisions based on reliable data. Validating the outputs of the inference engine verify that the autonomous vehicle will not be commanded to perform any forbidden maneuvers. Forbidden maneuvers may be maneuvers that may cause the autonomous vehicle to lose control or crash, stray into controlled airspace, etc.

Further, a method for verifying an inference engine can be implemented using an automated theorem proving tool. Automated theorem proving tools can be used to prove the mathematical correctness of the inference engine design and implementation.

SUMMARY

In one aspect, embodiments of the inventive concepts disclosed herein are directed to is an autonomous vehicle system. The autonomous vehicle system includes one or more output devices that control movement of the autonomous vehicle, one or more input sources that include local input sources and perceptive input sources, and a controller. The controller is configured to validate one or more inputs from the one or more input sources by determining that the one or more inputs contain reliable data. The controller is also configured to validate one or more outputs by determining that the one or more outputs are not outside a defined range. The controller is configured to provide the one or more validated outputs to the one or more output devices and store the one or more validated inputs in a fact base. The controller is configured to determine the one or more outputs by determining one or more applicable rules in the rule base and firing the one or more rules with information stored in the fact base as parameters for the rules. Furthermore, the controller is configured to validate one or more rules generated by a production rule source by determining that the one or more rules generated by the production rule source are consistent.

In a further aspect, embodiments of the inventive concepts disclosed herein are directed to is an autonomous controller. The controller includes one or more processing circuits. The processing circuits are configured to validate one or more inputs from one or more input sources by determining that the one or more inputs contain reliable data. The processing circuits are further configured to validate one or more outputs by determining that the one or more outputs are not outside a defined range. The processing circuits are further configured to determine the one or more outputs by determining one or more applicable rules in a rule base and firing the one or more rules with information stored in a fact base as parameters for the rules. The processing circuits are further configured to validate one or more rules generated by a production rule source by determining that the one or more rules generated by the production rule source are consistent.

In a further aspect, embodiments of the inventive concepts disclosed herein are directed to a method for autonomous decision making. The method includes validating one or more inputs from one or more input sources by determining that the one or more inputs contain reliable data, validating one or more outputs by determining that the one or more outputs are not outside a defined range, determining the one or more outputs by determining one or more applicable rules in the rule base and firing the one or more rules with information stored in a fact base as parameters for the rules, and validating one or more rules generated by a production rule source by determining that the one or more rules generated by the production rule source are consistent.

BRIEF DESCRIPTION OF THE DRAWINGS

Implementations of the inventive concepts disclosed herein may be better understood when consideration is given to the following detailed description thereof. Such description makes reference to the annexed drawings, which are not necessarily to scale, and in which some features may be exaggerated and some features may be omitted or may be represented schematically in the interest of clarity. Like reference numerals in the figures may represent and refer to the same or similar element, feature, or function. In the drawings.

DETAILED DESCRIPTION

Before describing in detail the inventive concepts disclosed herein, it should be observed that the inventive concepts disclosed herein include, but are not limited to, a novel structural combination of data/signal processing components, sensors, and/or communications circuits, and not in the particular detailed configurations thereof. Accordingly, the structure, methods, functions, control and arrangement of components, software, and circuits have, for the most part, been illustrated in the drawings by readily understandable block representations and schematic diagrams, in order not to obscure the disclosure with structural details which will be readily apparent to those skilled in the art, having the benefit of the description herein. Further, the inventive concepts disclosed herein are not limited to the particular embodiments depicted in the exemplary diagrams, but should be construed in accordance with the language in the claims.

Referring generally to the FIGURES, systems and methods for an autonomous system are shown according to various exemplary embodiments. The autonomous system may include a verified inference engine, a rule validator, an input validator, and an output validator. The verified inference engine may include a fact base and a rule base. The verified inference engine may use inputs received from the input sources and information stored in the fact base to generate outputs for the autonomous system and generate new information to be stored in the fact base. The autonomous system may include an input validator to validate the inputs received from the input sources. The input validator verifies that the inference engine makes decisions on reliable data. The autonomous system may include an output validator to validate the outputs determined by the verified inference engine. The output validator verifies that the verified inference engine does not command an output which is outside an operating envelope of the output devices. The verified inference engine may include a rule validator. The rule validator may verify that all production rules are consistent by using an automated theorem proving tool. The code developed for the verified inference engine must meet a high level of assurance. One algorithm to verify that the inference engine meets a high level of assurance is an automated theorem proving tool. An automated theorem proving tool can reason about the code to determine the mathematical correctness of the inference engine.

Autonomous System with an Inference Engine

Figure 1:
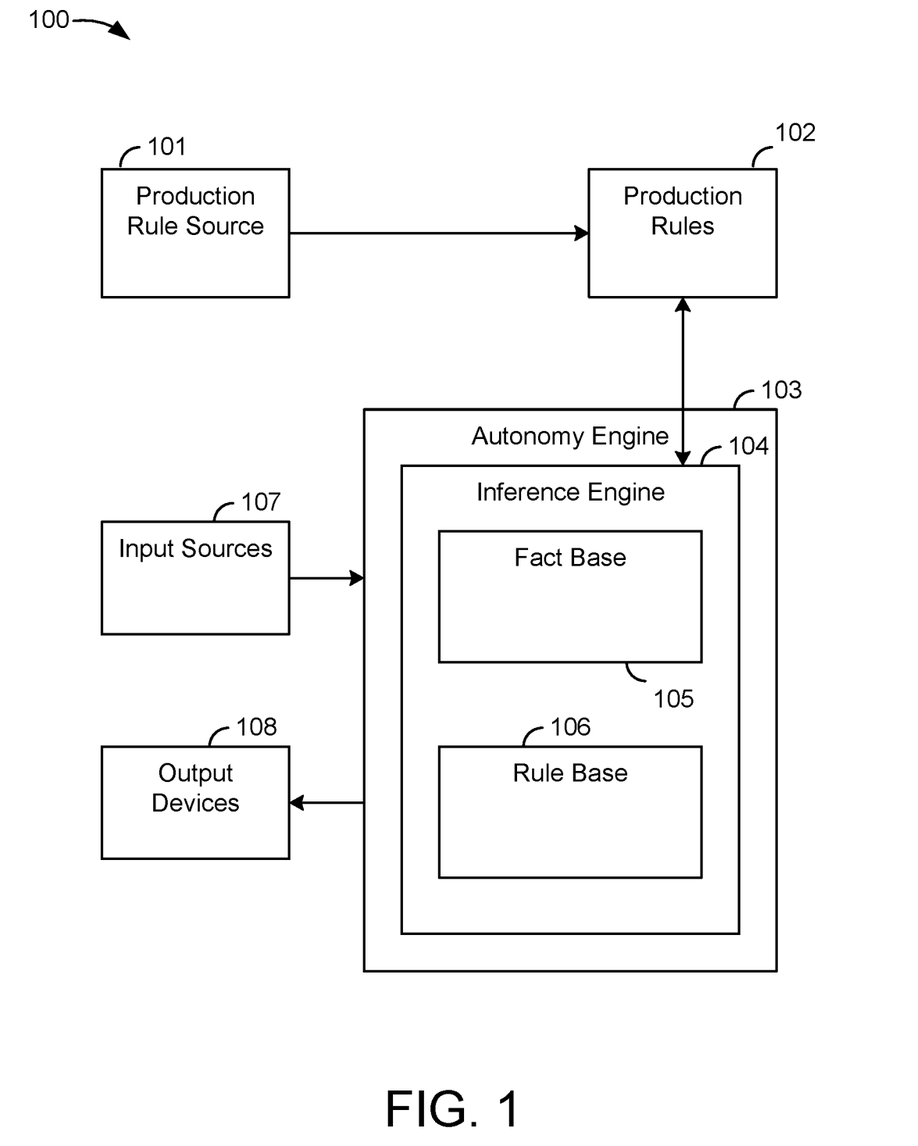
FIG. 1 is a block diagram of an autonomous system including an inference engine.

Referring to FIG. 1, an autonomous system 100 includes a production rule source 101, production rules 102, an autonomy engine 103, input sources 107, and output devices 108. The autonomy engine 103 includes an inference engine 104. The inference engine 104 includes a fact base 105 and a rule base 106. The inference engine 104 is a form of a semantic reasoner. In some embodiments, a semantic reasoner is a software program executed on a processing platform that infers logical consequences from a set of axioms or rules. In the case of the inference engine 104, the set of axioms is the rule base 106. The inference engine 104 is configured to receive inputs from the input sources 107 and provide outputs to the output devices 108.

In some embodiments, the rules of the inference engine 104 are a series of if-then statements stored in the rule base 106. The production rules 102 are generated at the production rule source 101 and stored in the rule base 106. The list of rules in the rule base 106 of the inference engine 104 are if-then rules. Each rule contains an if-condition and a then-clause. An example of such rules in pseudo code is the list of if-then statements below. Rules such as these are known as modus ponens. Modus ponens is a rule of logic that says that a consequence can be inferred from a condition if the condition is true. For example, $A(x)$ is a conditional statement. If this conditional statement is true, then some process or action $b(x)$ is executed. In some embodiments, the rules in the rule base 106 are in the form (where '=>' denotes logical implication):

Rule 1: $A(x) \Rightarrow b(x)$
Rule 2: $B(x) \Rightarrow c(x)$
Rule 3: $C(x) \Rightarrow d(x)$ In some embodiments, the input sources 107 include a plurality of input sources that are used to gather data to be stored in the rule base 106. The input sources 107 include a plurality of localized sensors and perceptive sensors. In some embodiments, the localized sensors include at least one of a temperature sensor, an altitude sensor, a pitch sensor, a heading sensor, a roll sensor, a global positioning system, a yaw sensor, an accelerometer, and/or a velocity sensor. In some embodiments, the perceptive inputs include a light detection and ranging (LIDAR) input source, a stereo vision source, a radio detection and ranging (RADAR) input source, an infrared vision source, an obstacle proximity input source, a radio beacon or other direction-finding source and/or a sound navigation ranging (SONAR) source.

In some embodiments, the output devices 108 include a plurality of actuators. The actuators can be configured to control a plurality of autonomous vehicles. In some embodiments, the vehicles include autonomous commercial aircraft, autonomous military aircraft, self-driving cars, autonomous surface ships, autonomous underwater vehicles (AUVs) and/or spacecraft. In some embodiments, the actuators include actuators controlling a brake, an accelerator, a throttle, a transmission, an electric motor, an gas engine, a jet engine, a propeller engine, a rocket engine, an aeronautic spoiler, an aeronautic aileron, an aeronautic flap, an aeronautic rudder, and an aeronautic elevator.

Figure 2:
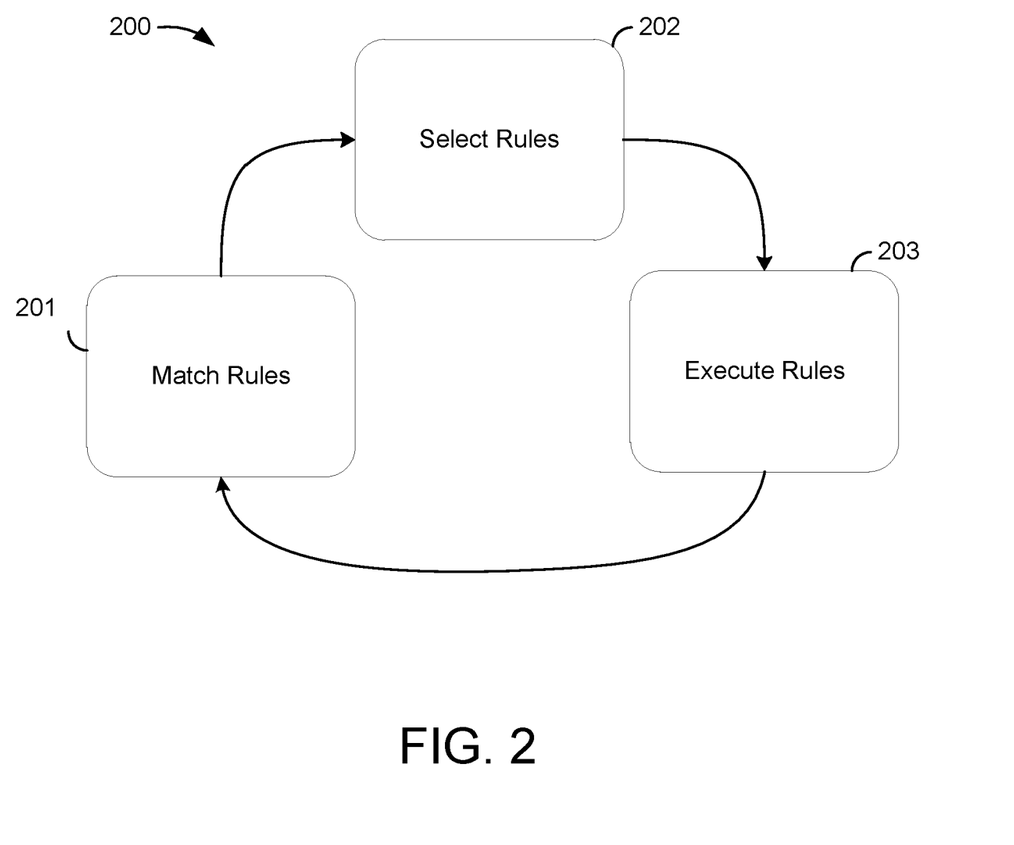
FIG. 2 is a schematic diagram of a state machine for the inference engine illustrated in FIG. 1.

Referring to FIG. 2, state machine 200 includes a match rules state 201, a select rules state 202, and an execute rules state 203. In some embodiments, inference engine 104 (FIG. 1) may perform state machine 200. When in the match rules state 201, the inference engine 104 (FIG. 1) determines all rules that are applicable with respect to the current information stored in the fact base 105 (FIG. 1). In the select rules state 202, the inference engine 104 (FIG. 1) applies a strategy to select which rules from rule base 106 (FIG. 1) to execute. In some embodiments, the strategy is ordering the rules in order of highest priority to lowest priority. The highest priority rule is fired first. In some embodiments, the highest priority rule firing is followed by firing rules that have a lower priority. In system 100 (FIG. 1), the highest priority rule is a rule which is most critical to the functionality of system 100 (FIG. 1). In the execute rules state 203, the inference engine 104 (FIG. 1) fires the selected rules with information in the fact base 105 (FIG. 1) used as parameters for the then-clause of the rules selected by the select rules state 202. Firing the rules generates outputs for the output devices 108 (FIG. 1) and generates new information to be stored in the fact base 105 (FIG. 1) depending on the nature of the then-clause. When fired, some then-clauses generate outputs for the output devices 108 (FIG. 1) but no new facts for the fact base 105 (FIG. 1). When fired, some then-clauses generate new information to be stored in the fact base 105 but no outputs for the output devices 108 (FIG. 1). When fired, some then-clauses generate new information to be stored in the fact base 105 (FIG. 1) and outputs for the output devices 108 (FIG. 1).

In some embodiments, the inference engine 104 (FIG. 1) repeats the loop of state machine 200 indefinitely. In some embodiments, there is an idle state in state machine 200. The state machine 200 reaches the idle state and waits for a specified input to be received before continuing. In some embodiments, the state machine 200 is started or stopped by user intervention. Each time the state machine 200 completes a cycle, new facts can be added to the fact base 105 (FIG. 1). In each cycle of the state machine 200, the state machine 200 selects and fires rules unique to previous cycles of the state machine 200.

In some embodiments, the state machine 200 is configured to perform forward-chaining when in the select rules state 202. Forward-chaining is a method for searching through the rule base 106 (FIG. 1) of the inference engine 104 (FIG. 1) for rules which the inference engine 104 (FIG. 1) can fire that are relevant to the current information stored in the fact base 105 (FIG. 1). When using forward-chaining, the inference engine 104 (FIG. 1) searches the rule base 106 (FIG. 1) by searching for rules where the if-condition of the if-then rule is known to be true from information stored in the fact base 105 (FIG. 1).

In some embodiments, the state machine 200 is configured to perform backward-chaining when in the select rules state 202. Backward-chaining is a search method which the inference engine 104 (FIG. 1) performs. When using backward-chaining, the inference engine 104 (FIG. 1) searches the rule base 106 (FIG. 1) by searching for rules in which the then-clause of the if-then rule matches a desired output. In some embodiments, a hybrid reasoning scheme is supported, in which forward chaining can lead to the pursuit of a backward chaining goal; or successful backward chaining can cause assertion of a fact that could then lead to forward chaining.

Autonomous System with a Verified Inference Engine

Figure 3:
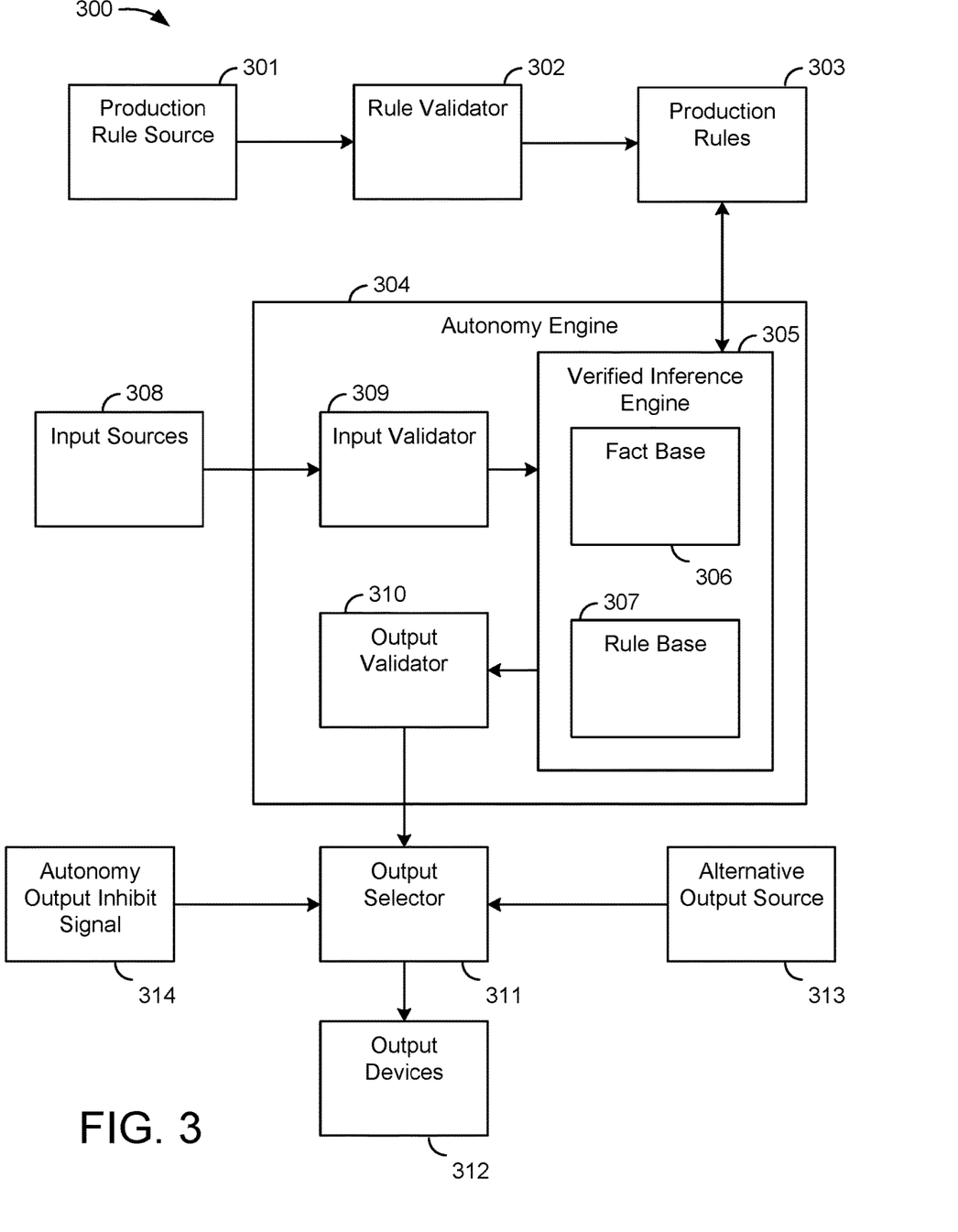
FIG. 3 is a block diagram of an autonomous system including a verified inference engine, an input validator, an output validator, a production rule source and a rule validator.

Referring to FIG. 3, an autonomous system 300 is shown according to an exemplary embodiment. System 300 includes a production rule source 301, a rule validator 302, production rules 303, an autonomy engine 304, input sources 308, an output selector 311, output devices 312, an alternative output source 313, and an autonomy output inhibit signal 314. The autonomy engine 304 includes a verified inference engine 305, an input validator 309, and an output validator 310. The verified inference engine 305 includes a fact base 306 and a rule base 307. The rule validator 302, the input validator 309, and the output validator 310 all contribute to an autonomous system 300 that operates at a high assurance level. In some embodiments, the high assurance level is a level which meets design and operational requirements of the DO-178C Level A standard and/or the Common Criteria EAL-7 standard.

The rule validator 302 is configured to verify that there is logical consistency among the rules of the production rule source 301. Production rules 303 are the rules that rule validator 302 determines to be logically consistent. Logically consistent rules are stored in the rule base 307 of the verified inference engine 305. The verified inference engine 305 operates on a fact base 306 which has logical consistency. Operating on the fact base 306 that has logical consistency contributes to the autonomous system 300 operating at high assurance.

The input validator 309 verifies that the input from the input sources 308 does not contain any flawed input data. In some embodiments, the input validator 308 is configured to ignore data that is determined to be flawed so that flawed data is not stored in the fact base 306. Inputs from input sources 308 are verified to determine that only reliable data is stored in the fact base 306.

Figure 4:
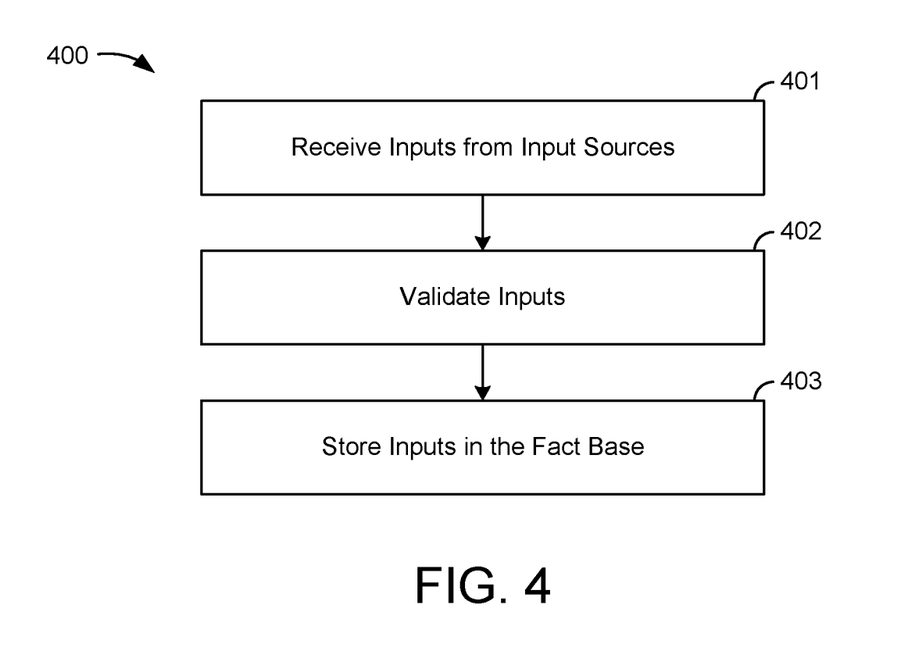
FIG. 4 is a diagram of an operational flow for validating inputs in the input validator illustrated in FIG. 3.

Referring to FIG. 4, the input validator 309 (FIG. 3) is configured to receive inputs from the input sources 308 (FIG. 3) (step 401). The input validator 309 (FIG. 3) validates the inputs by determining that the input lies in a predefined range of acceptable values (step 402). In some embodiments, the input validator 309 (FIG. 3) receives redundant inputs from the input sources 308 (FIG. 3). In some embodiments, the input validator 308 (FIG. 3) is configured to determine a midpoint for the input (step 402). In some embodiments, the midpoint is voted or an averaging calculation is performed. In some embodiments, a more sophisticated method is used to detect flawed data such as an artificial neural network (ANN) or a principal component analysis algorithm (PCA) (step 302). Inputs that have been validated and are determined to be reliable are stored in the fact base 306 (FIG. 3) (step 403).

In some embodiments, the input validator 309 (FIG. 3) performs data type validation (step 402). Data type validation is the verification that the input type is the expected input type. In some embodiments, the input type is a plurality of data types. The data types may include an integer type, a float type, a string type, a double type, a Boolean type or some other data type. As an example, in some embodiments the input validator 309 (FIG. 3) expects a float type input from a input source 308 (FIG. 3). If the input validator receives a different data type such as a double type, the input validator 309 (FIG. 3) will not store the input in the fact base 306 (FIG. 3).

Figure 5:
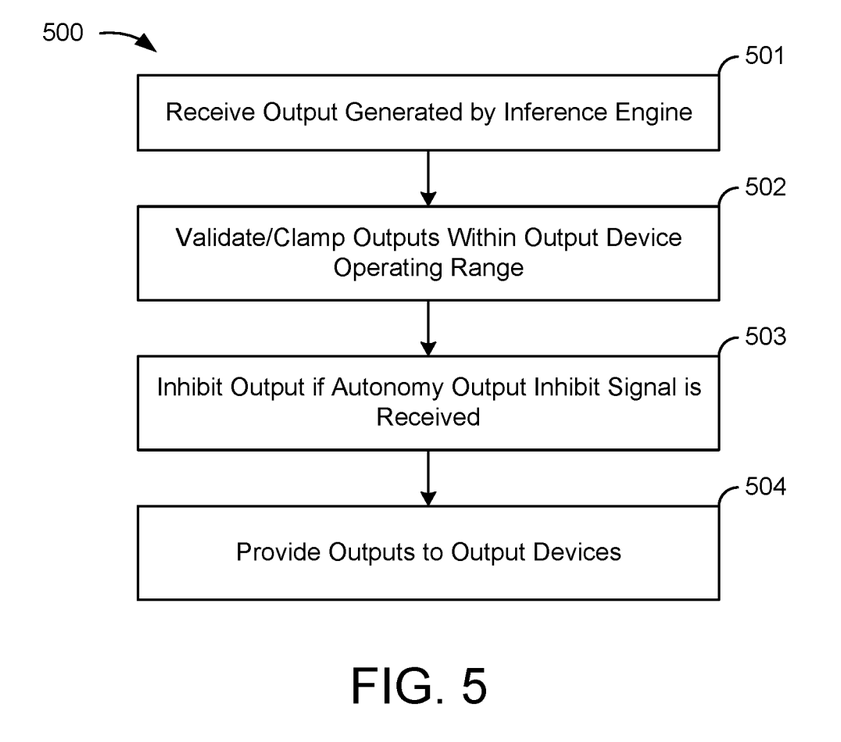
FIG. 5 is a diagram of an operational flow for validating outputs in the output validator illustrated in FIG. 3.

Referring to FIG. 5, the output validator 310 (FIG. 3) receives outputs generated by the verified inference engine 305 (FIG. 3) (step 501). In some embodiments, the output validator 310 (FIG. 3) validates the outputs by comparing the outputs against an operating envelope of the output devices 312 (FIG. 3) (step 502). The output validator 310 (FIG. 3) provides the validated output to the output selector 311 (step 503). If manual control of the output is requested, the output selector 311 (FIG. 3) will provide alternative output source 313 (FIG. 3) to the output devices 312 (FIG. 3) (step 504). If manual control of the output is not requested, the output selector 311 (FIG. 3) will provide the validated output from the output validator 310 (FIG. 3) to the output devices 312 (step 504).

The output validator 310 (FIG. 3) receives outputs from the verified inference engine 305 (FIG. 3) (step 501) and verifies that the outputs received remain within an operating envelope of the output devices 312 (FIG. 3) (step 502). The output validator 310 (FIG. 3) is configured to clamp an output of the inference engine (step 502). The output devices 312 (FIG. 3) have an upper output limit and a low output limit. The output validator 310 (FIG. 3) maintains an output of the verified inference engine 305 (FIG. 3) between the upper output limit and the lower output limit (step 502). If the output of the verified inference engine 305 (FIG. 3) exceeds the upper output limit, the output validator 310 (FIG. 3) sets the output to the upper output limit (step 502). If the output of the verified inference engine 305 (FIG. 3) is below the lower output limit, the output validator 310 (FIG. 3) sets the output to the lower output limit (step 502) in some embodiments.

The output selector 311 (FIG. 3) receives outputs from the alternative output source 313 (FIG. 3) and the output validator 310 (FIG. 3). The output selector 311 (FIG. 3) inhibits the output of the output validator 310 (FIG. 3) if the autonomy output inhibit signal 314 (FIG. 3) is received (step 503). The output selector 311 (FIG. 3) provides alternative outputs from alternative output source 313 to the output devices 312 when the autonomy output inhibit signal 314 (FIG. 3) is received (step 504). If the autonomy output inhibit signal 314 (FIG. 3) is not received (step 503), the output selector 311 (FIG. 3) provides the output from the output validator 310 (FIG. 3) to the output devices 312 (FIG. 3) (step 504). In some embodiments, output selector 311 (FIG. 3) is a two-to-one multiplexer. The two inputs for output selector 311 (FIG. 3) may be the output from output validator 310 (FIG. 3) and the output from the alternative output source 313 (FIG. 3). The control signal for operating the output selector 311 (FIG. 3) may be the autonomy output inhibit signal 314 (FIG. 3). In some embodiments, the control signal is a Boolean value that causes output selector 311 to switch between the output validator 310 (FIG. 3) and the alternative output source 313 (FIG. 3). In some embodiments, when the autonomy output inhibit signal 314 (FIG. 3) is true, the alternative output source 313 (FIG. 3) will be provided to the output devices 312 (FIG. 3) by output selector 311 (FIG. 3). In some embodiments, when the autonomy output inhibit signal 314 (FIG. 3) is false, the output from the validator 310 (FIG. 3) will be provided to the output devices 312 (FIG. 3).

Figure 6:
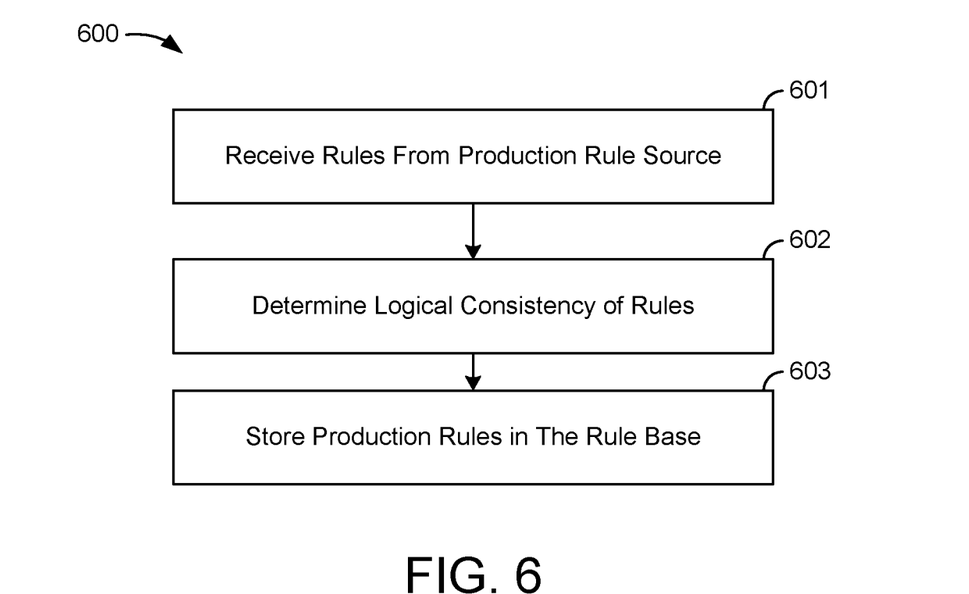
FIG. 6 is a diagram of an operational flow for establishing logical consistency of the rules received from the production rule source illustrated in FIG. 3.

Referring to FIG. 6, the rule validator 302 (FIG. 3) is configured to receive a set of rules from the production rule source 301 (step 601). The production rule source 301 (FIG. 3) is the set of rules written by a developer or an artificial intelligence. The rule validator 302 (FIG. 3) analyzes the set of rules and determines if there is logical consistency across the set of rules (step 602). Logically consistent rules are rules in which applications of different subsets of rules from the rule set, given some common initial condition, do not lead to a logical contradiction. In some embodiments, the algorithm used in the rule validator 302 (FIG. 3) is a plurality of consistency checking algorithms. In some embodiments, the algorithm is an automated theorem proving tool and/or a model checker. Rules that have been determined to be logically consistent by the rule validator 302 (FIG. 3) are stored in rule base 307 (FIG. 3) (step 603).

Figure 7:
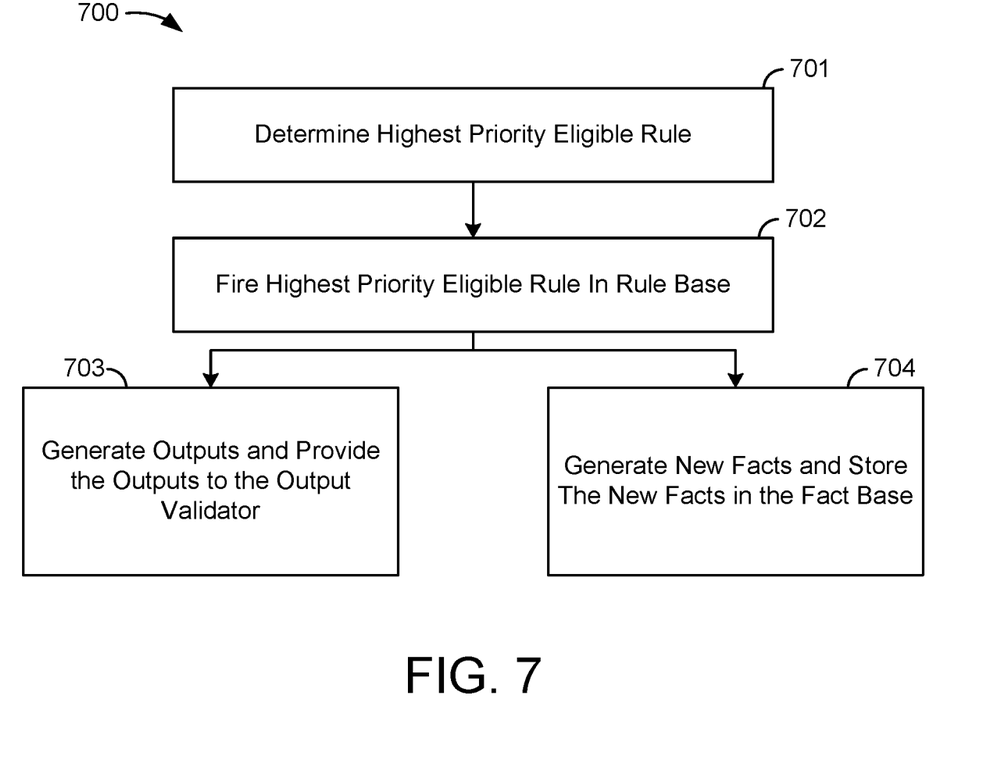
FIG. 7 is a diagram of an operational flow for determining and firing the highest priority eligible rule and generating outputs and new facts for a fact base in the verified inference engine illustrated in FIG. 3.

Referring to FIG. 7, the verified inference engine 305 (FIG. 3) performs a process 700 to determine eligible rules (step 701), fire the highest priority eligible rule (step 702), generate outputs (step 703), and generate new facts for the fact base (step 704). In some embodiments, the verified inference engine 305 (FIG. 3) searches a set of if-then rules in its rule base 307 (FIG. 3) for applicable rules based on the information stored in the fact base 306 (FIG. 3). The verified inference engine 305 (FIG. 3) uses a forward-chaining method or a backward-chaining method to perform the search. From the applicable rules, the verified inference engine 305 (FIG. 3) sorts the rules by their priority (step 701). The verified inference engine 305 (FIG. 3) fires the highest priority rule by using the information stored in the fact base 306 as parameters for the highest priority rule then-clause (step 702). The verified inference engine 305 generates outputs that can be provided to the output devices 312 (FIG. 3) (step 703). The verified inference engine 305 (FIG. 3) generates facts and stores the facts in the fact base 306 (FIG. 3) (step 704).

Figure 8:
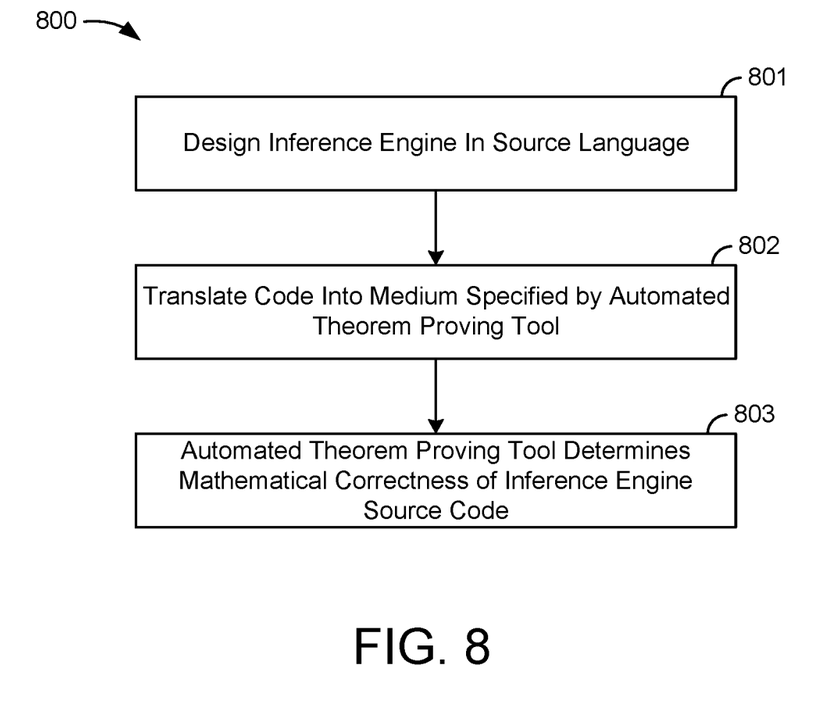
FIG. 8 is a diagram of an operational flow for validating that the verified inference engine of FIG. 3 is developed with high assurance using an automated theorem proving tool.

Referring to FIG. 8, the verified inference engine 305 (FIG. 3) is verified to operate at a high assurance level. The verified inference engine 305 (FIG. 3) can be developed in a plurality source languages (step 801). The source languages include but are not limited to at least one of Prolog, C/C++, C #, and ADA. The code developed in the source languages are converted into a format that can be analyzed by a plurality of algorithms (step 802). In some embodiments, the format is defined by the algorithm or the algorithm software. One algorithm is an automated theorem proving tool. An automated theorem proving tool can reason about the code developed in the source language to determine the mathematical correctness of the verified inference engine (step 803). In some embodiments, automated theorem proving is based on or uses unification. Unification is an algorithm for solving equations between symbolic expressions.

In some embodiments, the automated theorem proving tool takes the form of a plurality of software verification engines. The automated theorem proving tool is run on a plurality of processing devices in some embodiments. The processing devices are one or more microprocessors, an application specific integrated circuit (ASIC), a circuit containing one or more processing components, a group of distributed processing components, circuitry for supporting a microprocessor, or other hardware configured for processing. In some embodiments the Milawa engine or another engine performing verification steps in a similar way is used for software verification. The Milawa engine is a theorem prover that is self-verifying. Milawa verifies software with a plurality of proof checkers. The proof checkers are executed sequentially and each proof checker are used to verify the next proof checker executed. For example, the Milawa engine has proof checkers A, B, and C. The first proof checker run is A. Proof checker B only accept the formulas that proof checker A has verified. Therefore, proof checker A verifies proof checker B. Proof checker C only accept the formulas that proof checker B has verified. The process continues in this way until a final proof checker is run. In some embodiments, the automated theorem proving tool could be an interactive theorem prover, such as ACL2, Coq, HOL4, Isabelle/HOL, or PVS; a model checker, such as JKind, Kind2, NuXMV, or SAL; a Satisfiability Modulo Theories (SMT) solver, such as CVC4, SMTInterpol, or Z3; or a combination of interactive theorem prover, model checker, and/or SMT solver.

In some embodiments, the mathematical correctness level determined by the automated theorem proving tool (step 803) is used as evidence to determine the assurance level of the verified inference engine software. In some embodiments, the level of assurance must meet a plurality of software design standards such as DO-178C Level A or Common Criteria and/or EAL-7. In some embodiments, a threshold comparison is used to verify that the assurance level of the code meets the DO-178C and/or EAL-7 standards.

Example Implementation

Figure 9:
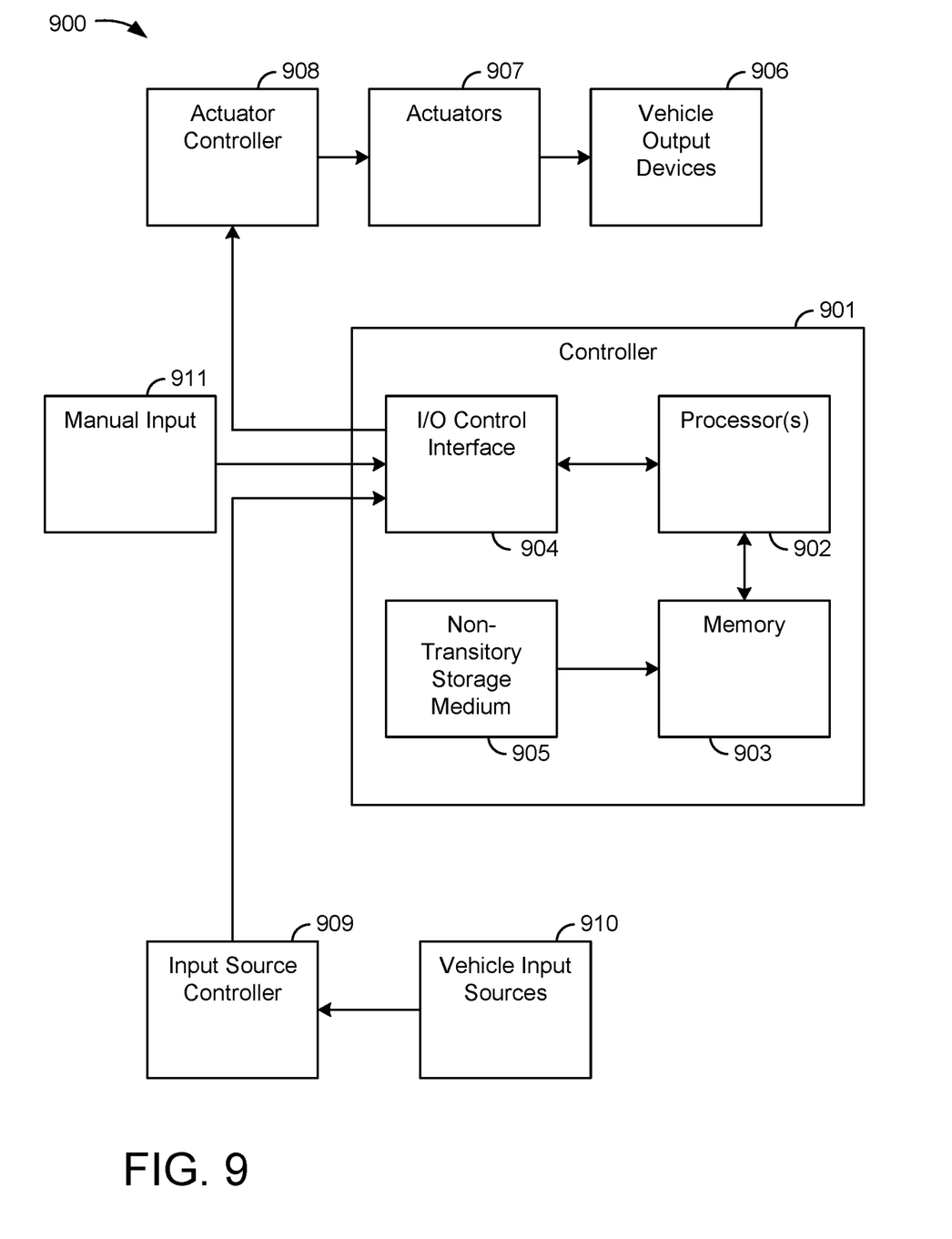
FIG. 9 is a drawing of an autonomous vehicle system including a controller, an actuator controller, an input source controller, and input sources and output devices.

Referring to FIG. 9, one implementation of the inventive concepts disclosed herein is an autonomous vehicle system 900. The autonomous vehicle system 900 includes a controller 901, vehicle output devices 906, actuators 907, an actuator controller 908, input source controller 909, vehicle input sources 910, and a manual input 911. The controller 901 includes processor(s) 902, a memory 903, an I/O control interface 904, and a non-transitory storage medium 905. The controller 901 is configured to operate the verified inference engine 305 (FIG. 3). The actuator controller 908 is configured to store information in the fact base 306 (FIG. 3) and rules in the rule based 307 (FIG. 3). All inputs of the autonomous vehicle system 900 are verified by controller 901 before providing the inputs to the verified inference engine 305 (FIG. 3) stored on the non-transitory storage medium 905 and memory 903. Verifying the inputs of autonomous vehicle system 900 verifies that the verified inference engine 305 (FIG. 3) makes decisions based on reliable data. The verified inference engine 305 (FIG. 3) is configured to use the fact base 306 (FIG. 3) and the rule base 307 (FIG. 3) to determine outputs for vehicle output devices 906. The outputs for the autonomous vehicle system 900 are validated to verify that the outputs are within the operating envelope of the vehicle output devices 906. If the outputs are validated, the outputs are provided to the vehicle output devices 906.

The autonomous vehicle system 900 is configured to operate at a high assurance level set forth by the DO-178C Level A standard and/or the Common Criteria EAL-7 standard. The autonomous vehicle system 900 has the set of production rules 303 (FIG. 3) for the verified inference engine 305 (FIG. 3) validated by the rule validator 302 (FIG. 3). In some embodiments, rule validator 302 (FIG. 3) uses automated theorem proving to establish logical consistency among the rules generated by the production rule source 301 (FIG. 3). The autonomous vehicle system 900 executes the verified inference engine 305 (FIG. 3) that has been verified with an automated theorem proving tool. The verified inference engine 305 (FIG. 3) executed by the autonomous system 900 is verified code stored on the non-transitory storage medium 914. The code is verified by using an automated theorem proving tool to reason about the code and verify a high level of assurance.

In some embodiments, the vehicle input sources 910 of the autonomous vehicle system 900 include one or more localized input sources and one or more perceptive input sources. In some embodiments, the localized input sources include one or more input sources. The input sources include a temperature sensor, an altitude sensor, a pitch sensor, a heading sensor, a roll sensor, a global positioning system, a yaw sensor, an accelerometer, and/or a velocity sensor in some embodiments. In some embodiments, the vehicle input sources 910 of the autonomous vehicle system 900 include one or more perceptive input sources. In some embodiments, the perceptive input sources include a light detection and ranging (LIDAR) input source, a stereo vision source, a radio detection and ranging (RADAR) input source, an infrared vision source, an obstacle proximity input source, a radio beacon or other direction-finding source and/or a sound navigation ranging (SONAR) source. The perceptive inputs sources are sources of data that sense surroundings using active or non-active sensors in some embodiments. The perceptive sources sense obstacles, weather, other vehicles and/or obstructions by analyzing received energy from the surroundings in some embodiments.

In some embodiments, the verified inference engine 305 (FIG. 3) is code stored on the non-transitory storage medium 914. The fact base 306 (FIG. 3) and the rule base 307 (FIG. 3) are stored on the non-transitory storage medium 914. In some embodiments, the fact base 306 (FIG. 3) stores information regarding the autonomous vehicle system 900 such as terrain, weather conditions, other vehicles, the physical surroundings of the autonomous vehicle, a map database, vehicle speed, vehicle acceleration, vehicle pitch, vehicle altitude, and vehicle roll. This information can be gathered from the vehicle input sources 910. In some embodiments, the code for the verified inference engine 305 (FIG. 3) is executed on the processor(s) 902. The processor(s) 902 can be, or can include one or more microprocessors, an application specific integrated circuit (ASIC), a circuit containing one or more processing components, a group of distributed processing components, circuitry for supporting a microprocessor, or other hardware configured for processing. In some embodiments, the execution of the code stored on the non-transitory storage medium 905 is used to determine new information to be stored in the fact base 306 (FIG. 3) as well as outputs for the vehicle output devices 906. In some embodiments, the verified inference engine executes the state machine 200 (FIG. 2) on processors(s) 902.

The autonomous vehicle system 900 can receive a signal from the manual input 911 commanding the output of the inference engine be withheld and the input of the manual input 911 be sent to the vehicle output devices 906. Manual input 911 can be generated from a plurality of manual control devices. In some embodiments, manual control devices are generated from a joystick, a yoke, a throttle, a steering wheel, a transmission shifter, an acceleration input source, and a break input source. In some embodiments, the autonomous vehicle receives manual input in the form of flight controls.

The autonomous vehicle system 900 provides the outputs of the verified inference engine 305 (FIG. 3) to the actuator controller 908. The actuator controller 908 controls the actuators 907 that control the vehicle output devices 906. In some embodiments, the vehicle output devices 906 include a brake, an accelerator, a transmission, an electric motor, an engine, a jet engine, a propeller engine, a rocket engine, an aeronautic spoiler, an aeronautic aileron, an aeronautic flap, an aeronautic rudder, and an aeronautic elevator in some embodiments.

The controller 901 uses an I/O control interface 904 to communicate with the actuator controller 908 and the input source controller 909. In some embodiments, the I/O control interface communicates via a wired connection such as Ethernet, RS485, RS232, USB, Firewire, or a proprietary communication scheme. The I/O control interface 904 receives the manual input 911. In some embodiments, the actuator controller 908 is incorporated into controller 901 or is a localized controller for controlling actuators 907. In some embodiments, input source controller 909 is incorporated into controller 901 or is a localized controller for monitoring vehicle input sources 910.

Configuration of Exemplary Embodiments

The scope of this disclosure should be determined by the claims, their legal equivalents and the fact that it fully encompasses other embodiments which may become apparent to those skilled in the art. All structural, electrical and functional equivalents to the elements of the above-described disclosure that are known to those of ordinary skill in the art are expressly incorporated herein by reference and are intended to be encompassed by the present claims. A reference to an element in the singular is not intended to mean one and only one, unless explicitly so stated, but rather it should be construed to mean at least one. No claim element herein is to be construed under the provisions of 35 U.S.C. § 112, sixth paragraph, unless the element is expressly recited using the phrase "means for." Furthermore, no element, component or method step in the present disclosure is intended to be dedicated to the public, regardless of whether the element, component or method step is explicitly recited in the claims.

Embodiments of the inventive concepts disclosed herein have been described with reference to drawings. The drawings illustrate certain details of specific embodiments that implement the systems and methods and programs of the present disclosure. However, describing the embodiments with drawings should not be construed as imposing any limitations that may be present in the drawings. The present disclosure contemplates methods, systems and program products on any machine-readable media for accomplishing its operations. Embodiments of the inventive concepts disclosed herein may be implemented using an existing computer processor, or by a special purpose computer processor incorporated for this or another purpose or by a hardwired system.

Embodiments in the inventive concepts disclosed herein have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure.

The foregoing description of embodiments has been presented for purposes of illustration and description. It is not intended to be exhaustive or to limit the subject matter to the precise form disclosed, and modifications and variations are possible in light of the above teachings or may be acquired from practice of the subject matter disclosed herein. The embodiments were chosen and described in order to explain the principals of the disclosed subject matter and its practical application to enable one skilled in the art to utilize the disclosed subject matter in various embodiments and with various modifications as are suited to the particular use contemplated. Other substitutions, modifications, changes and omissions may be made in the design, operating conditions and arrangement of the embodiments without departing from the scope of the presently disclosed subject matter.

What is claimed is:

1. An autonomous vehicle system, the system comprising:
   one or more autonomous vehicle actuators configured to control movement of an autonomous vehicle;
   one or more autonomous vehicle sensors; and
   a controller comprising a processing circuit, the processing circuit configured to:
      validate one or more rules received from a rule source by determining that the one or more rules received from the rule source are logically consistent;
      store the one or more validated rules in a rule base;
      store one or more inputs received from the one or more autonomous vehicle sensors in a fact base;
      determine one or more outputs by selecting one or more applicable rules of the one or more validated rules stored in the rule base and firing the one or more applicable rules with information stored in the fact base as parameters for the one or more applicable rules; and
      provide the one or more outputs to the one or more autonomous vehicle actuators.

2. The system of claim 1, wherein the processing circuit is further configured to execute verified code stored in a non-transitory storage medium coupled to the controller, the verified code being verified by:
   translating code stored on the non-transitory storage medium into a format for an automated theorem proving tool;
   determining a mathematical correctness level for the code using the automated theorem proving tool; and determining that the mathematical correctness level is above a threshold.

3. The system of claim 1, wherein the processing circuit is configured to determine that the one or more rules received from the rule source are logically consistent by using at least one of an automated theorem proving tool or a model checker.

4. The system of claim 1, wherein the processing circuit is further configured to disable the one or more outputs and provide a manual output to the one or more autonomous vehicle actuators in response to a command to enable manual control of the one or more autonomous vehicle actuators.

5. The system of claim 1, wherein the processing circuit is configured to:
 validate the one or more inputs received from the one or more autonomous vehicle sensors by determining that the one or more inputs are reliable; and
 store the one or more validated inputs in the fact base.

6. The system of claim 5, wherein the processing circuit is further configured to determine that the one or more inputs are reliable by performing at least one of:
 determining that the one or more inputs received from the one or more autonomous vehicle sensors are within an expected range;
 determining that redundant inputs of the one or more inputs are within an acceptable offset from one another; or
 using an artificial neural network to determine that the one or more inputs are reliable.

7. The system of claim 1, wherein the processing circuit is configured to:
 validate the one or more outputs by determining that the one or more outputs are within a predefined range; and
 provide the one or more validated outputs to the one or more autonomous vehicle actuators.

8. The system of claim 7, wherein the processing circuit is further configured to provide the one or more validated outputs to the one or more autonomous vehicle actuators by:
 sending the one or more outputs to the one or more autonomous vehicle actuators in response to a determination that the one or more outputs are within a range of values;
 setting the one or more outputs to an upper limit and sending the one or more outputs to the one or more autonomous vehicle actuators in response to a determination that the one or more outputs are greater than the upper limit; and
 setting the one or more outputs to a lower limit and sending the one or more outputs to the one or more autonomous vehicle actuators in response to a determination that the one or more outputs are less than the lower limit.

9. An autonomous controller for an autonomous vehicle, the controller comprising one or more processing circuits configured to:
 validate one or more rules received from a rule source by determining that the one or more rules received from the rule source are logically consistent and storing the one or more validated rules in a rule base;
 store one or more inputs received from one or more autonomous vehicle sensors of the autonomous vehicle in a fact base;
 determine one or more outputs by selecting one or more applicable rules of the one or more validated rules stored in the rule base and firing the one or more applicable rules with information stored in the fact base as parameters for the one or more applicable rules; and
 control movement of the autonomous vehicle by providing the one or more outputs to one or more autonomous vehicle actuators of the autonomous vehicle.

10. The controller of claim 9, wherein the one or more processing circuits are further configured to execute verified code stored on a non-transitory storage medium, the verified code being verified by:
 translating the code stored on the non-transitory storage medium into a format for an automated theorem proving tool;
 determining a mathematical correctness level for the code using the automated theorem proving tool; and
 determining that the mathematical correctness level is above a threshold.

11. The controller of claim 9, wherein the one or more processing circuits are configured to determine that the one or more rules received from the rule source are logically consistent by using at least one of an automated theorem proving tool or a model checker.

12. The controller of claim 9, wherein the one or more processing circuits are configured to:
 validate the one or more outputs by determining that the one or more outputs are within a predefined range; and
 provide the one or more validated outputs to the one or more autonomous vehicle actuators.

13. The controller of claim 9, wherein the one or more processing circuits are configured to:
 validate the one or more inputs received from the one or more autonomous vehicle sensors by determining that the one or more inputs are reliable; and
 store the one or more validated inputs in the fact base.

14. The controller of claim 13, wherein the one or more processing circuits are configured to determine that the one or more inputs are reliable by performing at least one of:
 determining that the one or more inputs received from the one or more autonomous vehicle sensors are within an expected range;
 determining that redundant inputs of the one or more inputs are within an acceptable offset from one another; or
 using an artificial neural network to determine that the one or more inputs are reliable.

15. The controller of claim 14, wherein the one or more processing circuits are configured to validate the one or more inputs by performing at least one of:
 selecting a midpoint of the redundant inputs and storing the midpoint in the fact base; or
 performing a vote on the redundant inputs to determine a voted input and store the voted input in the fact base.

16. A method for autonomous decision making, the method comprising:
 validating one or more rules received from a rule source by determining that the one or more rules received from the rule source are logically consistent and storing the one or more validated rules in a rule base;
 determining one or more outputs by selecting one or more applicable rules of the one or more validated rules stored in the rule base and firing the one or more applicable rules with information stored in a fact base as parameters for the one or more applicable rules; and
 controlling movement of an autonomous vehicle based on the one or more outputs by operating one or more autonomous vehicle actuators based on the one or more outputs.

17. The method of claim 16, wherein the method further comprises:
  validating one or more inputs received from one or more input sources by determining that the one or more inputs are reliable; and
  storing the one or more validated inputs in the fact base.

18. The method of claim 16, wherein the method further comprises:
  validating the one or more outputs by determining that the one or more outputs are within a predefined range; and
  controlling the movement of the autonomous vehicle by operating the one or more autonomous vehicle actuators based on the one or more validated outputs.

19. The method of claim 16, wherein determining that the one or more rules received from the rule source are logically consistent is performed by using at least one of an automated theorem proving tool or a model checker.

20. The method of claim 16, wherein the method further comprises:
  translating code stored on a non-transitory storage medium into a format for an automated theorem proving tool;
  determining a mathematical correctness level for the code using the automated theorem proving tool; and
  determining that the mathematical correctness level is above a threshold.

\* \* \* \* \*